US008583958B2

(12) United States Patent
Surkov

(10) Patent No.: US 8,583,958 B2
(45) Date of Patent: Nov. 12, 2013

(54) SYSTEMS AND METHODS OF PROVIDING FAST LEADER ELECTIONS IN DISTRIBUTED SYSTEMS OF SIMPLE TOPOLOGIES

(75) Inventor: Konstantin Surkov, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 493 days.

(21) Appl. No.: 12/945,952

(22) Filed: Nov. 15, 2010

(65) Prior Publication Data

US 2012/0124412 A1 May 17, 2012

(51) Int. Cl.
*G06F 11/00* (2006.01)
(52) U.S. Cl.
USPC .......................... 714/4.1; 714/4.11; 714/4.12
(58) Field of Classification Search
USPC ........................................ 714/4.1, 4.11, 4.12
See application file for complete search history.

(56) References Cited

U.S. PATENT DOCUMENTS

| | | | |
|---|---|---|---|
| 7,139,790 B1 | 11/2006 | Wang et al. | |
| 7,451,221 B2 | 11/2008 | Basani et al. | |
| 7,587,465 B1 | 9/2009 | Muchow | |
| 2005/0132154 A1* | 6/2005 | Rao et al. | 711/162 |
| 2005/0198359 A1 | 9/2005 | Basani et al. | |
| 2008/0071853 A1 | 3/2008 | Mosier et al. | |
| 2008/0071878 A1 | 3/2008 | Reuter | |
| 2008/0170592 A1* | 7/2008 | Hack et al. | 370/503 |
| 2008/0281938 A1 | 11/2008 | Rai et al. | |
| 2009/0097397 A1* | 4/2009 | Moreira Sa de Souza | 370/216 |
| 2009/0165018 A1* | 6/2009 | Junqueira et al. | 719/313 |
| 2010/0098090 A1* | 4/2010 | Westhoff et al. | 370/400 |
| 2010/0098102 A1* | 4/2010 | Banks et al. | 370/406 |

FOREIGN PATENT DOCUMENTS

CN 102523243 6/2012

OTHER PUBLICATIONS

M. Gholipour, et al. , "A New Approach for Election Algorithm in Distributed Systems", Communication Theory, Reliability, and Quality of Service, (Jul. 25, 2009), pp. 70-74. http://ieeexplore.ieee.org/stamp/stamp.jsp?tp=&arnumber=5176072.

Santos, Nuno, et al."Latency-aware Leader Election", Symposium on Applied Computing, Proceedings of the 2009 ACM symposium on Applied Computing, (Mar. 12, 2009) pp. 1056-1061, Honolulu, Hawaii, US http://infoscience.epfl.ch/record/143619/files/santos09LatencyAwareLeaderElection.pdf.

(Continued)

*Primary Examiner* — Scott Baderman
*Assistant Examiner* — Jigar Patel
(74) *Attorney, Agent, or Firm* — Wolfe-SBMC

(57) ABSTRACT

Systems and computer-implemented methods of electing a new leader node in distributed systems of simple topologies connecting a plurality of nodes on at least one computer system. The computer-implemented method comprises several steps including at least one node, which detected the absence of a leader, starting a first round for its approval as an Approved Election Initiator. If a quorum accepts the Start-Election request during the first round, then the Election Initiator starts a second round to set the leader. If a quorum of all nodes has not been reached during the first round, then the first round fails. The method repeats until a leader is set and is repeated each time a node discovers that the network does not have an active leader. Also provided herein is a computer readable medium having computer executable instructions stored thereon for performing the computer-implemented method.

20 Claims, 2 Drawing Sheets

(56) References Cited

OTHER PUBLICATIONS

Malkhi, Dahlia, "Omega Meets Paxos: Leader Election and Stability without Eventual Timely Links", 19th Intl. Symposium on Distributed Computing (DISC 05), Sep. 2005, Published by European Association for Theoretical Computer Science, Cracow, Poland, http://research.microsoft.com/pubs/64674/paxos-leader.pdf.

Lamport, Leslie, "Paxos Made Simple", ACM SIGACT News (Distributed Computing Column) 32, 4 (Whole No. 121, Nov. 2001) pp. 51-58.

Martin, Cristian, et al., "Implementing the Omega Failure Detector in the Crash-Recovery Failure Model", Journal of Computer and System Sciences (2009) pp. 178-189, vol. 75.

Guerraoui, Rachid, et al., "Consensus in Asynchronous Distributed Systems: A Concise Guided Tour", Distributed Systems, LNCS, (2000) pp. 33-47, vol. 1752.

* cited by examiner

SYSTEMS AND METHODS OF PROVIDING FAST LEADER ELECTIONS IN DISTRIBUTED SYSTEMS OF SIMPLE TOPOLOGIES

FIELD OF THE INVENTION

The present invention relates generally to systems and methods of distributing computing. More specifically, the present invention is directed to a computer readable medium having computer executable instructions stored thereon for performing the election of a leader node from multiple nodes in multiple processes within a single computer system, or within a network of computer systems, to solve the leader election problem in simple topologies, also known as "fully connected networks".

BACKGROUND ON THE INVENTION

In distributed systems, the leader election problem stems from the Consensus problem. Consensus is the process of agreeing on one result among a group of participants. The leader election problem is difficult to solve because participants (or their communication media) can experience failures.

As the number of nodes (n) grows, network chatter increases by $n^2$. So, if the number of nodes grows by 10, then chatter grows by 100. Therefore what is needed is a solution that addresses the Leader Election problem that minimizes network chatter.

Certain solutions known in the art involve synchronization of the clocks of all nodes so that all of the clocks reflect a synchronized, absolute time. This and other solutions involve several processes, subprocesses and rounds to elect a leader, which are cumbersome and inefficient.

Previous solutions exhibit a high probability of "bad" election collision, which is when two or more elections have started so close in time to each other that no quorum could be reached in order to finish the election. Moreover, previous solutions also do not guarantee that only a single leader is elected. Thus, what is needed is a system that minimizes bad election collision and guarantees that a single leader is elected.

Accordingly, what are needed are fast, efficient and simple systems and methods to guarantee the election of a single leader in simple topologies while minimizing network chatter so that when faults occur, recovery is substantially seamless.

SUMMARY

The present invention provides for fast, efficient and simple systems and methods of electing a new leader node in distributed systems of simple topologies. A computer-implemented method is provided that configures a node as a leader after a failure of an existing leader has been detected. An exemplary computer-implemented method makes the distributed systems of simple topologies fault tolerant. Also provided herein is a computer readable medium having computer executable instructions stored thereon for performing the method.

The method comprises several steps including starting a first round and a second round. The first round comprises the steps of sending a first Start Election request from one node (hereinafter referred to as the "Election Initiator") to all other nodes on the network, the Election Initiator node receiving a result of the first Start Election request from all other live nodes on the network within a predetermined response period, and the Election Initiator node determining whether a quorum of all other nodes on the network responded to the first Start Election request. Responses are received at different times or are not received at all. Several first rounds can proceed concurrently, but each election is started by a single node and only one first round, if any, will proceed to the second round. If the Election Initiator node determines that a quorum exists, then the Election Initiator node becomes an Approved Election Initiator node that starts the second round. To be clear, the use of the term "Election Initiator node" is merely exemplary, since several nodes can start the first round at or about the same time under the exemplary method, which still guarantees that only one leader will be elected. Each Election Initiator node is a node that has detected leader failure.

The second round comprises several steps including approval of the Election Initiator node as the Approved Election Initiator node by the quorum of all nodes on the network, selection of the leader by the Approved Election Initiator node and transmission of a Set Leader request by the Approved Election Initiator node to all other nodes on the network. The computer-implemented method including first and second rounds happens whenever any node detects leader failure. The CheckLeader requests are periodically issued by live nodes to monitor for leader failure.

Furthermore, in exemplary embodiments the method includes the step of selecting a preferred node as a leader, wherein the preferred node is selected from the Approved Election Initiator node, a node running the latest version of an application, the node with the most remaining uptime, a node with previous experience as the leader, and any equivalent and complementary preferential treatment of nodes. If the quorum does not exist, the computer-implemented method generates an AbortElection request from the Election Initiator node to all other nodes on the network.

In exemplary embodiments, the first round further comprises the steps of a plurality of nodes not holding a valid election token prior to delivery of the first StartElection request from the Election Initiator node accepting a first valid StartElection token. Also as a part of the first round, when there is not a quorum of all nodes on the network, the Election Initiator node delivers an AbortElection request to all live nodes on the network. When the AbortElection request is received by live nodes holding the matching StartElection token, they clear the StartElection token.

Several different nodes, each detecting the absence of a leader in the distributed system, start the first round; however only one node will acquire a quorum, or none will. Only the node that acquires a quorum proceeds to the second round where that node designates the leader and informs the rest of the nodes that the leader has been set.

BRIEF DESCRIPTION OF THE DRAWINGS

The various exemplary embodiments of the present invention, which will become more apparent as the description proceeds, are described in the following detailed description in conjunction with the accompanying drawings, in which.

DETAILED DESCRIPTION

Figure 1:
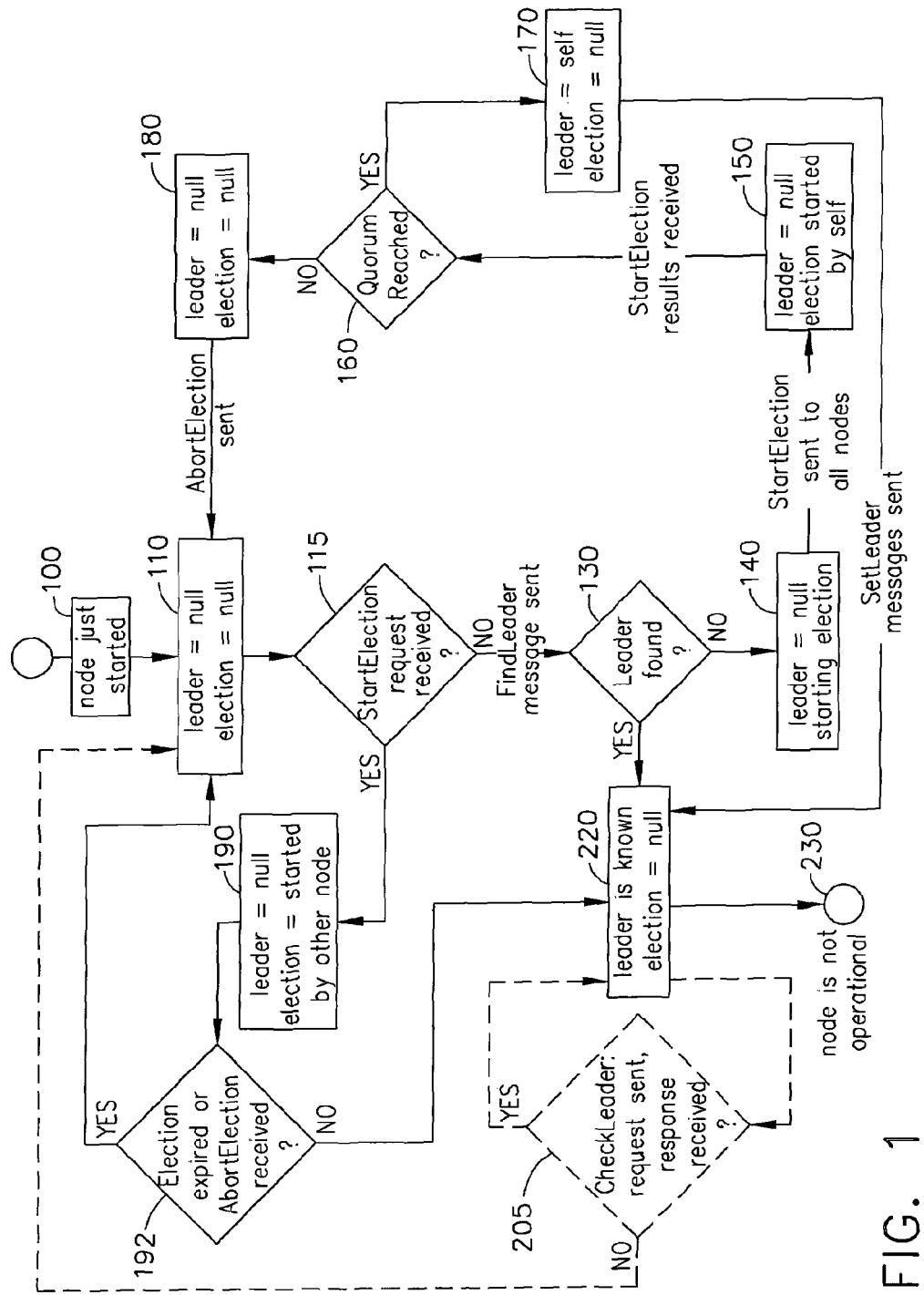
FIG. 1 illustrates a flowchart of an exemplary method of leader election for distributed systems of fully connected networks.

FIG. 1 illustrates a flowchart of an exemplary embodiment of the systems and methods for operating nodes within a network of computer systems or within multiple processes in a single computer system, to allow fast leader elections in distributed systems of fully connected networks. Substantially every node is initialized at Step 100 at some point in time. After initialization of the exemplary Election Initiator node shown in State 100, the Election Initiator node is unaware of the status of the leadership of the network as shown in State 110, where the local state of the node is leader=null, election=null, meaning that it is not aware of the current leader nor the ongoing election. All nodes start in State 110, or arrive at this state after some state transitions. For example, in exemplary embodiments, as a result of a failed first round of the election process (discussed further herein below), the Election Initiator node will reach the local state "leader=null, election=null" shown in State 110.

From State 110 the method continues to Step 115. During Step 115, if a StartElection request has been received from another node then the Election Initiator node transitions from State 110 to State 190. If no StartElection request has been received, then the Election Initiator node sends a FindLeader message and continues to Step 130.

Since only live nodes are aware of the identity of the newly elected leader, without a process in place, in the event that failed nodes recover, the failed nodes could remember the identity of the former leader and the system would operate with two or more leaders. The method shown in FIG. 1, however, prevents recovered nodes from assuming that the leader is the last leader that it followed. In the event that a failed node (even a failed node that was the most recent former leader) recovers to become a live node (as it joins the distributed network again at Step 100), it cannot assume that the leader is the last leader that it followed when it was live last, because it is configured to not retain a memory of the last leader. Instead, the exemplary recently recovered Election Initiator node shown in Step 100 enters the state "leader=null, election=null" as shown in State 110. If it does not receive a StartElection request from an auxiliary node as determined in Step 115, it broadcasts to all the nodes a message that essentially asks "Who is the Leader?" as shown in Step 130.

If there is a leader, the leader responds to the inquiring node with a message that essentially says "I am the Leader, and this is my unique identification number." Once aware of the leader, the Election Initiator node proceeds from Step 130 to State 220 where the leader is known and there is no need for an election (election=null). If the Election Initiator node does not receive such an answer from the leader, then the method continues on to start Round One at State 140 described below.

To minimize latency and network traffic, exemplary embodiments include two compact rounds of election after the leader cannot be detected in the system during the "Check Leader" interval. The optimization of the algorithmic function to these two rounds provides a simple solution to the Leader Election problem, as described in detail below. Round One is started by one or more nodes that detect that there is no leader of the network Round One The goal of Round One of the election is to approve an Election Initiator node as an "Approved Election Initiator node" to conduct Round Two of the election in which the network leader is selected. To initiate Round One, when a node detects a leader failure in Step 130, the Election Initiator node enters State 140, "leader=null, starting election." Any node in the system that has detected a leader failure and does not have a valid local election token will enter State 140. In exemplary embodiments, multiple nodes can enter State 140 and initiate Round One at substantially the same time. However, to explain the steps of Round One, the path of a single node designated "Election Initiator node" is followed herein. The Election Initiator starts the election by sending a "StartElection" request to all known nodes between State 140 and State 150.

Once the Election Initiator node has sent the "StartElection" request to all known nodes, if the Election Initiator node has not received an indication that a leader has been elected as a result of some other node since its determination in Step 130, the node enters State 150, "leader=null, election=started by self," indicating that the Election Initiator node initiated Round One. As discussed above, in exemplary embodiments multiple nodes start Round One, but at most one node will complete a successful Round One to enter Round Two. Each node accepts the first "StartElection" request it receives if it does not already hold a valid (e.g., not expired) election token and rejects subsequent StartElection requests. Each StartElection request has an expiration that is made known to the nodes receiving it. StartElection requests are not held past their expiration dates, leaving the nodes that hold expired StartElection requests free to accept new StartElection requests. A node does not accept a new StartElection request until its previous StartElection request expires. Each node maintains its own relative time to the last StartElection request it has received. The algorithm beneficially uses relative time (i.e., local time span for each node), so the absolute time values on different nodes do not have to be synchronized. Once all StartElection messages are sent, Election Initiator transitions from state 140 to state 150. At state 150 the Election Initiator node waits until all responses are received or timeout, whichever comes first.

There are two possible outcomes of Round One, as shown at Step 160, during which the disclosed algorithm essentially asks the question "Am I approved by a quorum?" The two possible outcomes are described in turn. A quorum is defined as more than half of all known nodes in the fully connected network. The quorum requirement guarantees that at most, one node will be approved to be the Approved Election Initiator node. All nodes, including the Election Initiator sending out the StartElection request, are aware of the total number of nodes in the distributed system. If the number of nodes changes, the new number is propagated to all nodes.

If, after Step 160, the last step in Round One, a quorum of all nodes, including failed nodes, has accepted the StartElection request, the process continues to Round Two at State 170. Alternatively, if after Step 160 a quorum of all nodes has not accepted the StartElection request, then the method proceeds to State 180, "leader=null, election=null". At this point, Round One is aborted locally at the Election Initiator and an "AbortElection" message is sent to all other nodes The Election Initiator node and all other nodes receiving the AbortElection message re-enter State 110 ("leader=null, election=null") as previously described.

Upon returning to Step 110, the Election Initiator node is back to the state of recognizing no known leader or any election in progress. Round One is initiated by one or more nodes at about the same time or sequentially, until a single instance of Round One successfully identifies an Approved Election Initiator node (i.e., Step 160 determines that a quorum has been reached) As described above, Round One is not started by nodes in State 110 that have received a StartElection request. This explains why, if the election has been started by another node, then the method proceeds from State 110 to enter State 190, where there is no leader and the election has been started by another node. From State 190, the method proceeds to Step 192. At Step 192 the node essentially asks "Have I received an election expired message?" and "Have I received an AbortElection message?" If the answer to one of these questions is yes, then node enters State 110.

The unique identification number of the node sending a message is included in the message being sent so that the receiver knows which node sent the message. All live nodes respond to requests, and the requesting nodes know how many other nodes are in the system. Thus, a requesting node knows with certainty whether it has been approved as the Approved Election Initiator node by determining whether a quorum of nodes has accepted the StartElection request. By design, if the number of live nodes in the system is less than a quorum, or if a system is partitioned such that no partition contains a quorum of live nodes, the election will fail.

After all AbortElection messages (if any) are received during Step 192, nodes transition from State 190 to State 110. AbortElection messages are sent out so that all of the other nodes can clear the election token they currently hold, and are thereafter able to accept a new StartElection request.

Round Two

Returning to Step 160, Round Two is initiated when the Election Initiator is approved by a quorum. The node that has been approved by the quorum as the Approved Election Initiator node chooses the leader from any node that has responded to the StartElection request. In some embodiments, the Approved Election Initiator node selects itself as the leader, as shown in State 170. Following selection of the leader, the leader data, including the unique identification number, is delivered to all of the nodes.

While State 170 shows that the leader=self, meaning the Approved Election Initiator node is the leader, this is exemplary only. The Approved Election Initiator node can select itself as the leader, but it is not required to do so. Moreover, the Approved Election Initiator node is not limited to selecting the leader from those nodes that accepted the StartElection request. In exemplary embodiments, the Approved Election Initiator node chooses a leader from the group of nodes comprised of itself and the nodes that responded to the StartElection request. Having the Approved Election Initiator node designate itself as the leader is a simple method that also minimizes network chatter. However, in selected embodiments, the system is optimized if another node other than the Approved Election Initiator node is selected as the leader. To be certain, the algorithm for choosing the leader by approving the Election Initiator node can vary depending on the optimization goal and can be determined without undue experimentation by an ordinary person with skill in the art. For example, during the staged rollout of a new version of an application, it can be beneficial to give preference to a node running the later version over the one running the former version. In other cases, it can be beneficial to prefer a node with the most remaining uptime, which makes selecting these computer systems more stable leaders. In other exemplary embodiments, the preferred node for leadership is one that has had previous experience as the leader. Persons with ordinary skill in the art recognize that there are many equivalent and complementary preferences that can be captured in the algorithm.

The Approved Election Initiator node notifies all nodes of its selection of the new leader by sending a "SetLeader" request that includes the unique identity of the selected leader to all known nodes. Thus, after the SetLeader request has been sent to all nodes, all live nodes are aware of the identity of the newly elected leader. Round Two ends at State 220. Nodes in State 220 know the identity of the leader and recognize that the election is over. From State 220 nodes continue to operate additional processes and applications unrelated to the fast leader election systems and methods described herein, and optionally enter the CheckLeader process shown in Step 205 and described below. Eventually the nodes at State 220 become inoperative as shown in State 230. From State 230 the nodes may start again at Step 100.

The type of communication channel (http, tcp, udp) is not important. Since the systems and methods provided herein are designed to work through unreliable channels, the quality of the channel is not necessary to operate the disclosed systems and methods.

CheckLeader, as shown in Step 205, is not included in the election process (Round One and Round Two), because leader election happens after leader failure has been detected. Furthermore, CheckLeader is an optional process by which leader failure is detected through asking the last known leader to respond. If the last known leader responds to the question presented in Step 205, then the node stays at State 220, where the leader is known and there is no need for an election. If the last known leader does not respond to the CheckLeader request, then the node enters State 110 previously described. The probability of bad election collision, which is when two or more elections have started so close in time to each other that none of them could acquire a quorum, is minimized by randomization of the CheckLeader interval shown. The CheckLeader interval is the period of time between CheckLeader attempts to detect a failure.

In general, probability of not electing the leader (Pf) is proportional to round trip time (herein "RTT") divided by the Check Leader interval (herein "CLI"). In exemplary embodiments, the RTT of StartElection is about one millisecond and the CLI is about one hundred milliseconds. Thus, in these exemplary embodiments, the probability of not electing the leader of one attempt is about one percent (1.00%), and the probability of not electing the leader in two attempts is about one one-hundredth percent (0.01%) and decreasing exponentially with the number of attempts.

The contemplated simple algorithm and implementation through simplified code as applied to simple topologies are improved solutions over traditional methods. The simplicity of having a solution to the leader election problem for simple topologies in two rounds is a vast improvement over known leader election solutions, because the method described herein provides for reliable elections that are remarkably quicker when implemented for simple topologies.

Figure 2:
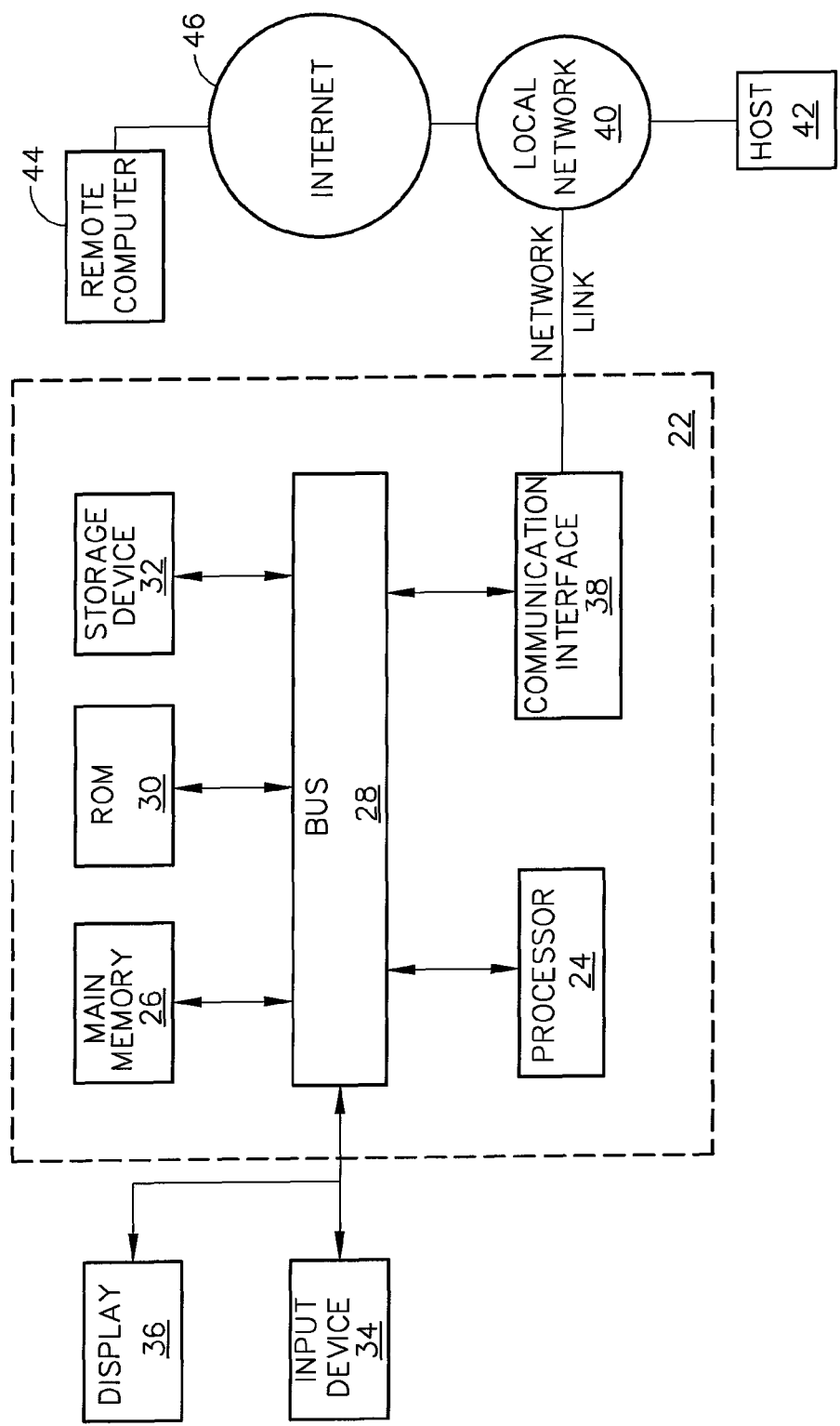
FIG. 2 illustrates an exemplary computing device that can be used to implement one or more embodiments.

FIG. 2 shows an exemplary computer system 22 having components that can be used to implement one or more of the embodiments described above. The exemplary Election Initiator node of the fast leader election systems and methods in exemplary embodiments is embodied as computer system 22, while in other exemplary embodiments the exemplary Election Initiator node is one of several components of computer system 22 described below. Computer system 22 includes one or more processing units 24, a main memory 26, and a bus 28 that couples various system components including main memory 26 to processors 24. The bus 28 represents one or more of any of several types of bus structures, including a memory bus or memory controller, a peripheral bus, an accelerated graphics port, and a processor or local bus using any of a variety of bus structures. The main memory 26 can be random access memory (RAM) or another dynamic storage device coupled to bus 28 for storing information and instructions to be executed by the processor 24. Main memory 26 can also be used for storing temporary variables or other intermediate information during execution of instructions by the processor 24. The computer 22 also includes read only memory (ROM) 30.

Computer 22 further includes a one or more storage devices 32. Storage device 32 can include a hard disk drive for reading from and writing to a hard disk, a magnetic disk drive for reading from and writing to a removable magnetic disk, and an optical disk drive for reading from or writing to a removable optical disk such as a CD or other optical media. The storage device, whether a hard disk drive, a magnetic disk drive, an optical disk drive, or a combination thereof, is connected to the bus 28 by an appropriate interface. The drives and their associated computer-readable media provide nonvolatile storage of computer-readable instructions, data structures, program modules and other data for computer 22. Although the exemplary embodiment described herein refers to a hard disk, a removable magnetic disk, and a removable optical disk, it should be appreciated by those skilled in the art that other types of computer-readable media which can store data that is accessible by a computer, such as magnetic cassettes, flash memory cards, digital video disks, random access memories (RAMs), read only memories (ROMs), and the like, can also be used in the exemplary operating environment.

A number of program modules can be stored on the storage device 32, RAM, and ROM, including an operating system, one or more application programs, other program modules, and program data. A user can enter commands and information into the computer 22 through input devices 34 such as a keyboard and a pointing device. Other input devices 34 can include a microphone, joystick, game pad, satellite dish, scanner, or the like. These and other input devices 34 are connected to the processor 24 through an interface that is coupled to the bus 28. A monitor or other type of display device 36 is also connected to the bus 28 via an interface. In addition to the monitor, personal computers typically include other peripheral output devices such as speakers and printers.

Computer 22 also includes a communication interface 38 coupled to bus 28. Communication interface 38 provides a two-way data communication coupling to a network link that is connected to a local network 40. Communication interface 38 can be an integrated services digital network (ISDN) card or a modem to provide a data communication connection to a corresponding type of telephone line or a local area network (LAN) card to provide a data communication connection to a compatible LAN. Wireless links can also be used, depending on the specific application contemplated. In any such implementation, communication interface 38 sends and receives electrical, electromagnetic or optical signals that carry digital data streams representing various types of information.

Computer 22 commonly operates in a networked environment using local connections to one or more remote computers, such as host computer 42 or remote computer 44. The remote computer 38 can be another personal computer, a server, a router, a network PC, a peer device or other common network node, and typically includes many or all of the elements described above relative to computer 22. In the embodiment shown in FIG. 2, the network link provides a connection through local network 40 to a host computer 42 or to remote computer 44 via the internet 46.

Generally, the data processors of computer 22 are programmed by means of instructions stored at different times in the various computer-readable storage media of the computer. At execution, programs are loaded at least partially into the computer's primary electronic memory from the computer's secondary memory where they are stored. The invention described herein includes these and other various types of computer-readable storage media when such media contain instructions or programs for implementing the steps described in conjunction with a microprocessor or other data processor.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting.

Various changes may be made without departing from the spirit and scope of the invention.

What is claimed is:

1. A computer-implemented method for configuring a node as a new leader after an Election Initiator node detects an existing leader failure on a network of nodes connecting a plurality of nodes on at least one computer system, the method comprising:
   starting a first round, said first round comprising:
      sending at least one StartElection request from the Election Initiator node to all other nodes on the network;
      accepting a first valid StartElection token, said accepting being conducted by a plurality of nodes not holding a valid election token prior to the delivery of the first StartElection request from the Election Initiator node;
      receiving a result of said at least one StartElection request from all live nodes on the network, the receiving conducted by the Election Initiator node;
      determining whether a quorum of said Election Initiator node and said all other nodes on the network accepted the at least one StartElection request, the determining being conducted by the Election Initiator node; and
         if the quorum does not exist, delivering an AbortElection request to all other nodes on the network, said delivering conducted by the Election Initiator node;
   starting a second round upon detection of a quorum, said second round comprising:
      approving the Election Initiator node as the Approved Election Initiator;
      selecting the new leader, said selecting being conducted by the Approved Election Initiator; and
      sending a SetLeader request to said all other nodes on the network.

2. The method of claim 1 further comprising:
   selecting a preferred node as the new leader.

3. The method of claim 2 wherein the preferred node is selected from the group comprising the Election Initiator node, a node running the latest version of an application, the node with the most remaining uptime, a former leader, and any equivalent and complementary preferential treatment of nodes.

4. The method of claim 1 further comprising: periodically repeating the method.

5. The method of claim 1 wherein each said valid StartElection token has an expiration date.

6. The method of claim 5 wherein the StartElection token expires before said determining whether a quorum exists is completed and the first round is initiated by an alternative node.

7. The method of claim 6 further comprising: periodically repeating the method.

8. The method of claim 1, wherein a plurality of nodes start the first round.

9. The method of claim 8, wherein only one node proceeds to the second round.

10. The method of claim 1, further comprising: periodically sending a CheckLeader request to said all other nodes on the network.

11. A computer readable storage memory having computer executable instructions stored thereon for performing the method of claim 1.

12. A computer readable storage memory having computer executable instructions stored thereon for performing the method of claim 2.

13. A computer readable storage memory having computer executable instructions stored thereon for performing the method of claim 3.

14. A computer readable storage memory having computer executable instructions stored thereon for performing the method of claim 4.

15. A computer readable storage memory having computer executable instructions stored thereon for performing the method of claim 5.

16. A computer readable storage memory having computer executable instructions stored thereon for performing the method of claim 6.

17. A computer readable storage memory having computer executable instructions stored thereon for performing the method of claim 7.

18. A computer readable storage memory having computer executable instructions stored thereon for performing the method of claim 8.

19. A computer readable storage memory having computer executable instructions stored thereon for performing the method of claim 9.

20. A computer readable storage memory having computer executable instructions stored thereon for performing the method of claim 10.

* * * * *